(12) United States Patent
Yoshioka et al.

(10) Patent No.: US 12,469,875 B2
(45) Date of Patent: Nov. 11, 2025

(54) COMPOSITE OXIDE POWDER, METHOD FOR PRODUCING COMPOSITE OXIDE POWDER, METHOD FOR PRODUCING SOLID ELECTROLYTE OBJECT, AND METHOD FOR PRODUCING LITHIUM ION SECONDARY BATTERY

(71) Applicants: FUJI PIGMENT CO., LTD., Kawanishi (JP); GS ALLIANCE CO., LTD., Kawanishi (JP)

(72) Inventors: Hideki Yoshioka, Kawanishi (JP); Ryohei Mori, Kawanishi (JP)

(73) Assignees: FUJI PIGMENT CO., LTD., Kawanishi (JP); GS ALLIANCE CO., LTD., Kawanishi (JP)

( * ) Notice: Subject to any disclaimer, the term of this patent is extended or adjusted under 35 U.S.C. 154(b) by 825 days.

(21) Appl. No.: 17/762,553

(22) PCT Filed: Sep. 24, 2020

(86) PCT No.: PCT/JP2020/035962
§ 371 (c)(1),
(2) Date: Mar. 22, 2022

(87) PCT Pub. No.: WO2021/060349
PCT Pub. Date: Apr. 1, 2021

(65) Prior Publication Data
US 2022/0344707 A1    Oct. 27, 2022

(30) Foreign Application Priority Data

Sep. 26, 2019 (JP) .................. 2019-175683
Mar. 24, 2020 (JP) .................. 2020-052231

(51) Int. Cl.
*H01M 10/0562* (2010.01)
*C01G 25/00* (2006.01)
(Continued)

(52) U.S. Cl.
CPC ...... *H01M 10/0562* (2013.01); *C01G 25/006* (2013.01); *C04B 35/488* (2013.01);
(Continued)

(58) Field of Classification Search
CPC .................. H01M 10/0562; H01M 10/052
See application file for complete search history.

(56) References Cited

U.S. PATENT DOCUMENTS

2010/0203383 A1   8/2010   Weppner
2014/0186720 A1   7/2014   Kintaka
(Continued)

FOREIGN PATENT DOCUMENTS

CN   109755637 A   5/2019
JP   2010-045019 A   2/2010
(Continued)

OTHER PUBLICATIONS

Adams et al. (J. Mater. Chem., 2012, 22, 1426-1434)).*
(Continued)

*Primary Examiner* — Olatunji A Godo
(74) *Attorney, Agent, or Firm* — Troutman Pepper Locke LLP; James E. Armstrong, IV; Nicholas J. DiCeglie, Jr.

(57) ABSTRACT

Provided are a composite oxide powder from which dense solid electrolyte objects having a high ion conductivity can be produced and a method for producing the composite oxide powder. The composite oxide powder is composed of particles comprising lithium (Li), lanthanum (La), zirconium (Zr), and oxygen (O) and having a cubic garnet-type crystal structure, and has a volume particle size distribution in which the 50% diameter (D50) is 1,000 nm or smaller, the composite oxide powder having a pyrochlore phase content of 10 mass % or less.

15 Claims, 12 Drawing Sheets

(51) Int. Cl.
  *C04B 35/488* (2006.01)
  *C04B 35/50* (2006.01)
  *C04B 35/626* (2006.01)
  *H01M 10/052* (2010.01)

(52) U.S. Cl.
  CPC .......... *C04B 35/50* (2013.01); *C04B 35/6264* (2013.01); *H01M 10/052* (2013.01); *C01P 2002/74* (2013.01); *C01P 2002/77* (2013.01); *C01P 2004/62* (2013.01); *C01P 2006/40* (2013.01); *C04B 2235/764* (2013.01); *H01M 2300/0071* (2013.01)

(56) References Cited

U.S. PATENT DOCUMENTS

| | | | |
|---|---|---|---|
| 2016/0111751 A1 | 4/2016 | Badding et al. | |
| 2016/0308244 A1* | 10/2016 | Badding | H01M 10/0525 |
| 2021/0194045 A1* | 6/2021 | Beck | H01M 10/0525 |

FOREIGN PATENT DOCUMENTS

| | | | |
|---|---|---|---|
| JP | 2014-170734 A | 9/2014 | |
| JP | 5634865 B2 | 12/2014 | |
| JP | 2018-516219 A | 6/2018 | |
| WO | 2016/0168039 A1 | 10/2016 | |

OTHER PUBLICATIONS

Supplementary European Search Report dated Aug. 30, 2023, issued in the EP Patent Application No. 20867719.5.

Haruo Imagawa et al., "Garnet-type Li6.75La3Zr1.75Nb0.25O12 synthesized by coprecipitation method and its lithium ion conductivity," Solid State Ionics 262, 2014, pp. 609-612. (cited in the Aug. 26, 2024 Request for Patent Cancellation filed for KR10-2643327).

Amardeep et al., "Mg-doping towards enhancing the composition-phase-structural stability of Li—La-zirconate based cubic garnet upon exposure to air," Scripta Materialia 162, 2019, pp. 214-218. (cited in the Aug. 26, 2024 Request for Patent Cancellation filed for KR10-2643327).

Request for Patent Cancellation filed on Aug. 26, 2024 in the KR Patent No. 10-2643327.

Jian-Fang Wu et al., "Gallium-Doped Li7La3Zr2O12 Garnet-Type Electrolytes with High Lithium-Ion Conductivity", Applied Materials and Interfaces, Sep. 2017, p. 1542-1552.

Mei Hong, "A Century of Imagination 120 Technology Foresight for the Future", Shanghai Jiaotong University Press, Mar. 2016, pp. 257 and cover sheet. (See the machine translation of the Oct. 10, 2022 Office Action issued for Cn202080067171.X as a concise explanation of the relevance.).

Office Action issued in the CN Patent Application No. 202080067171.X, mailed on Oct. 10, 2022 and English translation thereof.

* cited by examiner

COMPOSITE OXIDE POWDER, METHOD FOR PRODUCING COMPOSITE OXIDE POWDER, METHOD FOR PRODUCING SOLID ELECTROLYTE OBJECT, AND METHOD FOR PRODUCING LITHIUM ION SECONDARY BATTERY

TECHNICAL FIELD

The present invention relates to a composite oxide powder, a method for producing a composite oxide powder, a method for producing a solid electrolyte, and a method for producing a lithium-ion secondary battery.

BACKGROUND ART

A lithium-ion secondary battery is used as power sources for portable devices such as mobile phones and personal computers, as well as batteries for environmentally friendly vehicles (for example, electric vehicles) and power storage systems for renewable power generation (for example, wind power generation). Demand for lithium-ion secondary batteries has been increasing due to the spread of portable devices and growing interest in environmental issues in recent years.

Lithium-ion secondary batteries are required to have high energy density. In addition, batteries which safely and stably operate to prevent accidents such as ignition are required. In such circumstances, an all-solid-state lithium-ion secondary battery using a solid electrolyte instead of a liquid electrolyte is attracting attention. Liquid electrolytes often include a flammable organic solvent. Therefore, a lithium-ion secondary battery including a liquid electrolyte cannot eliminate a risk of ignition and liquid leakage. Furthermore, during repeated charging and discharging, there is a problem in that a lithium (Li) component in the negative electrode grows into a dendrite, causing a short circuit between the positive electrode and the negative electrode. Contrary to this, a battery having a solid electrolyte does not have such a problem and is excellent in safety and reliability.

As the solid electrolyte of the all-solid-state lithium-ion secondary battery, a garnet-type composite oxide has been proposed. For example, Patent Document 1 discloses a solid ion conductor having a garnet-type crystal structure having a stoichiometric composition: $L_{7+x}A_xG_{3-x}Zr_2O_{12}$ [in the formula, L is an alkali metal ion selected from $Li^+$, $Na^+$, or $K^+$, A is a divalent metal cation, G is a trivalent metal cation, $0 \leq x \leq 3$ is satisfied, and in the formula, O may be partially or completely replaced by a divalent anion] (claim 1 of Patent Document 1). Furthermore, Patent Document 1 discloses that the stoichiometric composition is $Li_7La_3Zr_2O_{12}$, that ion conductivity is shown to be enhanced as compared with a compound of conventional technology, and that the compound can be used as a solid electrolyte for a battery having a very high energy density (see claim 6 and paragraphs [0023] and of Patent Document 1).

Furthermore, Patent Document 2 discloses an all-solid lithium secondary battery including a positive electrode, a negative electrode, and a solid electrolyte containing ceramics including Li, La, Zr, and O and having a garnet-type or garnet-like crystal structure (claim 1 of Patent Document 2). Furthermore, Patent Document 2 discloses that the Li—La—Zr-based ceramic is excellent in lithium resistance and lithium-ion conducting property, and is useful as a solid electrolyte for all-solid secondary batteries ([0039] of Patent Document 2).

Patent Document 1: Japanese Patent No. 5634865
Patent Document 2: Japanese Unexamined Patent Application, Publication No. 2010-45019

DISCLOSURE OF THE INVENTION

Problems to be Solved by the Invention

A battery is required to have smaller size and higher capacity, and further improvement of the characteristics of a solid electrolyte, in particular, ionic conductivity, is required. However, conventional solid electrolytes disclosed in Patent Documents 1 and 2 have room for improvement to meet this requirement.

The present inventors have extensively studied production conditions for producing a cubic garnet-type composite oxide powder, and have found that it is possible to obtain a fine powder including fewer hetero-phases and that use of the powder makes it possible to produce a dense solid electrolyte having high ionic conductivity.

The present invention has been completed based on such finding, and its object is to provide a composite oxide powder from which a solid electrolyte being dense and having high ionic conductivity can be produced, and a method for producing the composite oxide powder. The present invention also has an object that is to provide a method for producing a solid electrolyte and a lithium-ion secondary battery including the composite oxide powder.

Means for Solving the Problems

The present invention includes the following aspects (1) to (17). Note here that the expression "to" between numerical values includes the numerical values at both ends, in this specification. In other words, "X to Y" has the same meaning as "X or more and Y or less".

(1) A composite oxide powder including particles including lithium (Li), lanthanum (La), zirconium (Zr), and oxygen (O), and having a cubic garnet-type crystal structure,
 the composite oxide powder having a 50% diameter (D50) in a volume particle size distribution of 1000 nm or less, and a content ratio of a pyrochlore phase of 10 mass % or less.

(2) The composite oxide powder according to the above (1), wherein the 50% diameter (D50) is 600 nm or less.

(3) The composite oxide powder according to the above (1) or (2), wherein the 50% diameter (D50) is 500 nm or less.

(4) The composite oxide powder according to any one of the above (1) to (3), wherein the particles have a basic composition represented by the formula: $Li_7La_3Zr_2O_{12}$.

(5) The composite oxide powder according to any one of the above (1) to (4), wherein the particles further include at least one dopant element selected from the group consisting of aluminum (Al), gallium (Ga), magnesium (Mg), and niobium (Nb).

(6) The composite oxide powder according to any one of the above (1) to (5), wherein the particles further include only gallium (Ga) as the dopant element.

(7) The composite oxide powder according to the above (6), wherein the particles have a basic composition represented by the formula: $Li_{7-3x}Ga_xLa_3Zr_2O_{12}$ (wherein $0.1 \leq x \leq 0.5$ is satisfied).

(8) The composite oxide powder according to any one of the above (1) to (7), wherein the composite oxide powder has a peak half width of a (211) diffraction line in an X-ray diffraction (XRD) profile of 0.50° or less.

(9) A method for producing a composite oxide powder according to any one of the above (1) to (8), the method including:
preparing at least a lithium (Li) source, a lanthanum (La) source, and a zirconium (Zr) source as raw materials;
blending and mixing the raw materials to obtain a mixture;
firing the mixture to obtain a fired product;
pulverizing the fired product to obtain a pulverized product; and
heat-treating the pulverized product to obtain a heat-treated product,
the fired product being pulverized in an organic solvent using a bead mill, when pulverizing the fired product.

(10) The method according to (9), wherein lithium carbonate ($Li_2CO_3$) is used as the lithium (Li) source.

(11) The method according to the above (9) or (10), wherein in blending the raw materials, the lithium (Li) source is blended in an amount of 1 to 20 mass % in excess with respect to a stoichiometric composition of a garnet-type crystal structure.

(12) The method according to any one of the above (9) to (11), wherein in firing the mixture, the mixture is subjected to a first firing at a temperature of 700° C. to 1000° C., and further to a second firing at a temperature of 900° C. to 1100° C.

(13) The method according to any one of the above (9) to (12), wherein the organic solvent is at least one selected from the group consisting of an alcohol-based solvent, a ketone-based solvent, an ester-based solvent, a glycol ether-based solvent, a hydrocarbon-based solvent, an ether-based solvent, a glycol-based solvent, and an amine-based solvent.

(14) The method according to the above (13), wherein the organic solvent is isopropyl alcohol (IPA) and/or toluene.

(15) The method according to the above (13) or (14), wherein the organic solvent is toluene.

(16) A method for producing a solid electrolyte, the method including:
preparing a composite oxide powder;
molding the composite oxide powder into a molded body; and
firing the molded body to obtain a sintered body;
the composite oxide powder being produced by the method according to any one of the above (9) to (15), when preparing the composite oxide powder.

(17) A method for producing a lithium-ion secondary battery, the method including:
preparing at least an exterior material, a positive electrode, a negative electrode, and a solid electrolyte; and
disposing the positive electrode and the negative electrode in the exterior material such that the positive electrode and the negative electrode face each other, and
disposing the solid electrolyte between the positive electrode and the negative electrode,
the solid electrolyte being produced by the method according to the above (16), when preparing the solid electrolyte.

Effects of the Invention

The present invention provides a composite oxide powder from which a solid electrolyte which is dense and has high ionic conductivity can be produced, and provides a method for producing the composite oxide powder.

PREFERRED MODE FOR CARRYING OUT THE INVENTION

Figure 1:
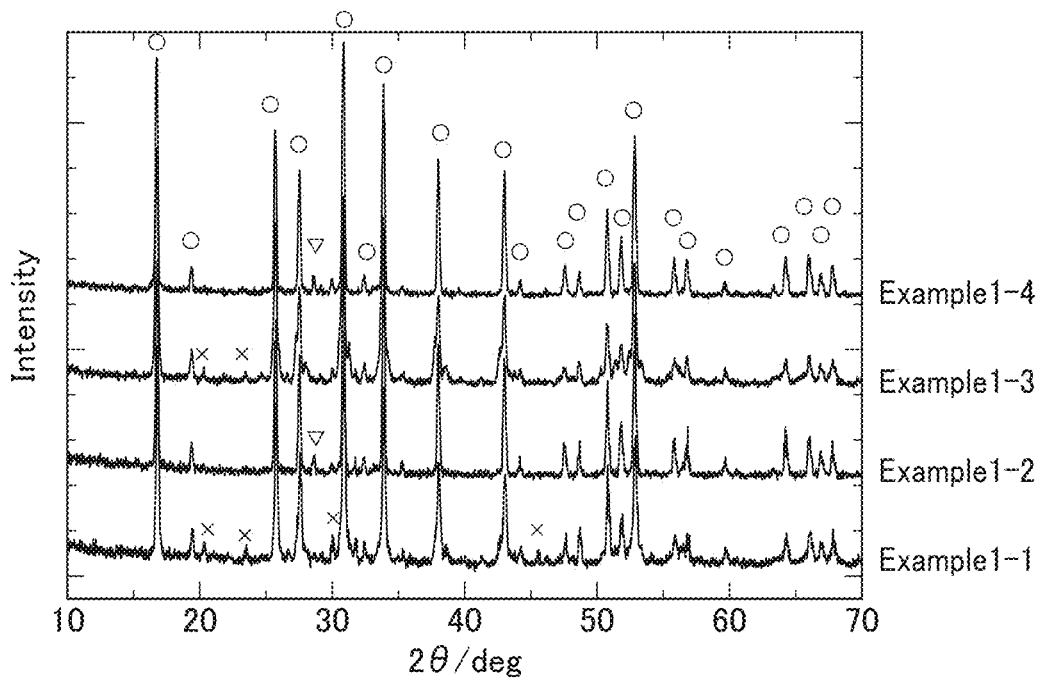
FIG. 1 is a view showing X-ray diffraction profiles of fired products.

Specific embodiment of the present invention (hereinafter, referred to as "this embodiment") is described. However, the present invention is not limited to the following embodiment, and various modifications can be appropriately made without departing from the spirit of the present invention.

Composite Oxide Powder

A composite oxide powder of this embodiment includes particles including lithium (Li), lanthanum (La), zirconium (Zr), and oxygen (O), and having a cubic garnet-type crystal structure. This composite oxide powder has a 50% diameter (D50) in a volume particle size distribution of 1000 nm or less, and a content ratio of a pyrochlore phase of 10 mass % or less.

As crystal structures of garnet-type composite oxides, tetragonal and cubic structures are known. Among them, the cubic garnet-type composite oxide has high lithium ionic conductivity, excellent chemical stability, and a wide potential window. Further, by using lithium (Li), lanthanum (La), zirconium (Zr), and oxygen (O) as constituent elements of the composite oxide, the crystal structure is further stabilized, and the composite oxide has excellent lithium resistance. Therefore, the composite oxide powder of this embodiment is useful as a material for a solid electrolyte in various applications such as a lithium-ion secondary battery. In this present specification, the particle refers to an individual particle, and a plurality of particles collectively constitute the powder, which exhibits fluidity as a whole.

Particles constituting the composite oxide powder further include only gallium (Ga) as a dopant element. In other words, the composite oxide powder (particles) includes lithium (Li), lanthanum (La), zirconium (Zr), gallium (Ga), and oxygen (O), and the balance is inevitable impurities. The inevitable impurities are components that are inevitably incorporated in the production process and have a content of 5000 ppm or less. By substituting gallium (Ga) for elements (Li and the like) constituting the particles, the characteristics such as ionic conductivity and sintering property of the composite oxide powder are further improved.

The particles constituting the composite oxide powder preferably have a basic composition represented by the formula: $Li_{7-3x}Ga_xLa_3Zr_2O_{12}$ (wherein $0.1 \leq x \leq 0.5$ is satisfied). This basic composition is a garnet-type stoichiometric composition ($Li_7La_3Zr_2O_{12}$; LLZO) including lithium (Li), lanthanum (La), zirconium (Zr), and oxygen (O) as constituent elements and being doped with gallium (Ga). Use of this basic composition (stoichiometric composition) stabilizes the crystal structure of the composite oxide powder and further increases the ionic conductivity. Furthermore, when the amount x of gallium (Ga) is increased to a certain extent, an effect of the gallium dope can be sufficiently exhibited. However, excessively containing of gallium may deteriorate characteristics. Therefore, the amount x of gallium is preferably $0.1 \leq x \leq 0.5$, and more preferably $0.2 \leq x \leq 0.4$. Note here that the composition of the particles may not necessarily be a strict stoichiometric composition. A deviation of about ±10% of the composition due to blurring or contamination of impurities during blending of raw materials is allowed. Furthermore, the composite oxide powder does not exclude the inclusion of components other than particles having a garnet-type structure. Examples of such components include additives such as sintering aids.

The composite oxide powder of this embodiment has a 50% diameter (D50) in the volume particle size distribution of 1000 nm or less. In this way, when the composite oxide powder is made fine, the sintered body (solid electrolyte) produced by using the composite oxide powder becomes dense, and bulk resistance and grain boundary resistance become small. In combination thereof, the ionic conductivity of the sintered body (solid electrolyte) becomes remarkably high. D50 is preferably 750 nm or less, more preferably 600 nm or less, and most preferably 500 nm or less. The lower limit of D50 is not particularly limited. However, D50 may be 200 nm or more, and may be 400 nm or more.

The composite oxide powder of this embodiment has a content ratio of the pyrochlore phase of 10 mass % or less. Herein, the pyrochlore phase is a hetero-phase having a composition represented by the formula: $La_2Zr_2O_7$. A lithium (Li) atom constituting the garnet-type structure has a high vapor pressure and high reaction property with respect to water. Therefore, in production of the composite oxide powder, lithium (Li) easily comes out from raw materials and treated products through volatilization and dissolution into water. When lithium (Li) comes out, a large amount of pyrochlore phases ($La_2Zr_2O_7$) are generated in the composite oxide powder. The pyrochlore phase has small ionic conductivity. Therefore, if a large amount of pyrochlore phases are generated, the ionic conductivity of composite oxide powder is deteriorated. By reducing the content ratio of the pyrochlore phase in the composite oxide powder, the ionic conductivity becomes excellent. The content ratio of the pyrochlore phase is preferably 10 mass % or less, and more preferably 5 mass % or less. The content ratio may be 0 mass %.

The particles constituting the composite oxide powder may further include at least one dopant element (Me) selected from the group consisting of aluminum (Al), gallium (Ga), magnesium (Mg), and niobium (Nb). When elements (Li, La, Zr, and O) constituting the particle are substituted by the above-mentioned dopant elements (Me), characteristics such as the ionic conductivity and sintering property of the composite oxide powder may be improved. However, excessively containing of a dopant element may deteriorate characteristics. Therefore, the content of the dopant element is preferably 0.1 or more, and more preferably 0.2 or more in a molar ratio with respect to $Li_7La_3Zr_2O_{12}$ (LLZO). Furthermore, the amount of dopant elements is preferably 0.5 or less, more preferably 0.4 or less, and further preferably 0.3 or less. On the other hand, the composite oxide may not include tantalum (Ta).

Particles constituting the composite oxide powder preferably further include only gallium (Ga) as the dopant element. In this case, the composite oxide powder (particles) includes lithium (Li), lanthanum (La), zirconium (Zr), gallium (Ga), and oxygen (O), and the balance is inevitable impurities. Herein, the inevitable impurities are components that are inevitably incorporated in the production process, and have a content of 5000 ppm or less. By substituting gallium (Ga) for elements (Li and the like) constituting the particles, the characteristics such as ionic conductivity and sintering property of the composite oxide powder are further improved.

The particles constituting the composite oxide powder preferably have a basic composition represented by the formula: $Li_{7-3x}Me_xLa_3Zr_2O_{12}$ (wherein $0.1 \leq x \leq 0.5$ is satisfied), and in particular, a basic composition represented by the formula: $Li_{7-3x}Ga_xLa_3Zr_2O_{12}$ (wherein $0.1 \leq x \leq 0.5$ is satisfied). This basic composition is a garnet-type stoichiometric composition ($Li_7La_3Zr_2O_{12}$; LLZO) including lithium (Li), lanthanum (La), zirconium (Zr), and oxygen (O) as constituent elements and being doped with a dopant element (Me) such as gallium (Ga). Use of this basic composition (stoichiometric composition) stabilizes the crystal structure of the composite oxide powder and further increases the ionic conductivity. Furthermore, when the amount x of the dopant element (Me) such as gallium (Ga) is increased to a certain extent, an effect of the dope can be sufficiently exhibited. However, excessively containing of the dopant element may deteriorate characteristics. Therefore, the amount x of the dopant element is preferably $0.1 \leq x \leq 0.5$, and more preferably $0.2 \leq x \leq 0.4$. Note here that the composition of the particles may not necessarily be a strict stoichiometric composition. A deviation of about ±10% of the composition due to blurring or contamination of impurities during mixing of raw materials is allowed. Furthermore, the composite oxide powder does not exclude the inclusion of components other than particles having a garnet-type structure. Examples of such components include additives such as sintering aids.

It is preferable that the composite oxide powder have a peak half width of the (211) diffraction line in the X-ray diffraction (XRD) profile of 0.50° or less. The garnet-type structure shows two strong peaks, a (211) diffraction line and a (420) diffraction line, in the X-ray diffraction profile. For example, when CuKα is used for the radiation source, the (211) diffraction line appears in the vicinity of $2\theta=16.7°$, and the (420) diffraction line appears in the vicinity of $2\theta=30.8°$. Therefore, the half-width of the (211) diffraction line can be used as an index of the crystallinity of the garnet structure. A composite oxide powder having a small peak half-width of the (211) diffraction line is excellent in crystallinity, and has more excellent in the ionic conductivity. The peak half-width is preferably 0.40° or less, and more preferably 0.30° or less. The peak half-width is typically 0.05° or more, and more typically 0.10° or more.

Method for Producing a Composite Oxide Powder

A method for producing a composite oxide powder according to this embodiment includes: preparing at least a lithium (Li) source, a lanthanum (La) source, and a zirconium (Zr) source as raw materials (raw material preparation step); blending and mixing these raw materials to obtain a mixture (raw material mixing step); firing the mixture to obtain a fired product (firing step); and pulverizing the fired product to obtain a pulverized product (pulverizing step); and heat-treating the pulverized product to obtain a heat-treated product. Furthermore, in pulverizing the fired product, when the fired product is pulverized in an organic solvent using a bead mill. Hereinafter, each step is described in detail.

<Raw Material Preparation Step>

In the raw material preparation step, at least a lithium (Li) source, a lanthanum (La) source, and a zirconium (Zr) source are prepared as a raw material. Furthermore, when a composite oxide including a dopant element (Me) is produced, a dopant element source such as a gallium (Ga) source is prepared. A well-known ceramic raw material can be used as the raw material. Examples of such raw materials include metal oxides, metal hydroxides, carbonates, nitrates, organometallic compounds and/or metals. However, metal oxides, metal hydroxides, carbonates and/or hydrates thereof are preferable because they are inexpensively available and can be easily handled. For example, lithium carbonate ($Li_2CO_3$), lithium hydroxide (LiOH) and/or lithium oxide ($Li_2O$) can be used as the lithium (Li) source. Furthermore, as a lanthanum (La) source, lanthanum carbonate ($La_2(CO_3)_3$), lanthanum hydroxide ($La(OH)_3$) and/or lanthanum oxide ($La_2O_3$) can be used. Zirconium oxide ($ZrO_2$) can be used as the zirconium (Zr) source. Gallium oxide ($Ga_2O_3$) can be used as the gallium (Ga) source.

It is preferable to use lithium carbonate ($Li_2CO_3$) as the lithium (Li) source. When lithium carbonate ($Li_2CO_3$) is used, garnet structure formation in the subsequent firing step more easily proceeds, as compared with a case where lithium hydroxide (LiOH) is used and the fired product or composite oxide powder including a small amount of impurities can be obtained. In addition, lithium carbonate ($Li_2CO_3$) has lower moisture absorption property as compared with lithium hydroxide (LiOH), and can be handled easily.

<Raw Material Mixing Step>

In the raw material mixing step, the prepared raw materials are blended and mixed to obtain a mixture. The blending ratio may be such that a composite oxide powder having a desired composition can be obtained. For example, when a stoichiometric composition ($Li_7La_3Zr_2O_{12}$) garnet-type composite oxide is produced, lithium (Li), lanthanum (La), and zirconium (Zr) may be blended such that the atom ratio is 7:3:2. Furthermore, when a garnet-type composite oxide having a basic composition ($Li_{7-3x}Ga_xLa_3Zr_2O_{12}$) is produced, lithium (Li), gallium (Ga), lanthanum (La), and zirconium (Zr) may be blended such that the atom ratio is 7−3x:x:3:2. However, as described later, it is preferable to blend an excessive amount of lithium (Li) in considering volatilization of lithium (Li) in the firing step. Mixing may be carried out by a well-known method used in the field of ceramics production. Examples of the mixing device include a mortar, a grinding mixer, a Henschel mixer, a ball mill, and a vibration mill. The mixing can be carried out in either or both of wet method and dry method.

In blending of the raw materials, it is preferable to blend the lithium (Li) source in an amount of 1 to 20 mass % in excess with respect to the stoichiometric composition of the garnet-type crystal structure. Lithium (Li) has a high vapor pressure and, and is easily volatilized in the subsequent firing step. When the fired product becomes lithium (Li)-deficient composition due to volatilization, the pyrochlore phase ($La_2Zr_2O_7$) causing deterioration of the ionic conductivity is easily generated. Therefore, in order to compensate the volatilization of lithium (Li) in the firing step, it is preferable that the lithium (Li) source be blended in excess in the blending step. When the excess blending amount is too small, volatilization of lithium (Li) is not sufficiently compensated. On the other hand, when the excess blending amount is too large, a hetero-phase including lithium (Li) in excess may be generated in the fired product. Therefore, the excess blending amount is preferably 1 to 20 mass %, more preferably 5 to 15 mass %, and further preferably 6 to 10 mass %.

Firing Step

In the firing step, the obtained mixture is fired (pre-fired) to form a fired product (pre-fired product). The firing is carried out in order to generate a garnet-type composite oxide by causing thermal decomposition of the raw materials and promoting the reaction between the raw materials. For example, when carbonate or hydroxide is used as a raw material, carbon dioxide and moisture are removed in the initial stage of firing. Thereafter or simultaneously, the components in the raw material react with each other to generate a garnet-type composite oxide. In order to promote the thermal decomposition and reaction of the raw material, it is desirable to carry out the firing at a certain high temperature for a long time. The firing temperature is preferably 700° C. or more, more preferably 800° C. or more, and further preferably 900° C. or more. Furthermore, the retention time of the firing is preferably 6 hours or more, more preferably 8 hours or more, and further preferably 10 hours or more. On the other hand, if the calcination proceeds excessively, the grain growth of the fired product may progress excessively, making it difficult to carry out pulverization in the subsequent pulverization step. Therefore, the firing temperature is preferably 1200° C. or less, more preferably 1150° C. or less, and further preferably 1100° C. or less. Furthermore, the retention time is preferably 16 hours or less, more preferably 14 hours or less, and further preferably 12 hours or less.

The firing atmosphere is not particularly limited as long as the garnet-type composite oxide can be obtained. However, the atmosphere is preferably oxygen-containing atmosphere such as the atmospheric air or an oxygen atmosphere, and particularly preferably atmospheric air. Furthermore, firing may be carried out by a well-known technique used in the field of ceramics. For example, the raw material mixture can be charged into a crucible, a setter, or the like, and fired in a firing furnace as it is. A furnace known as the firing furnace may be used.

The firing of the mixture may be carried out only once, but the firing is carried out preferably multiple times, for example, twice. By firing a plurality of times, the garnet structure formation of the mixture more easily proceeds. Therefore, the crystallinity of the fired product becomes excellent, and generation of the impurity phase is suppressed. In firing the mixture, it is particularly preferable that the mixture be subjected to a first firing at a temperature of 700° C. or more and 1000° C. or less, and a second firing at a temperature of 900° C. or more and 1100° C. or less. Note here that when firing is carried out a plurality of times, the retention time of one firing is only required to be in the above-mentioned range (for example, 16 hours or less).

<Pulverizing Step>

In the pulverizing step, the obtained fired product is pulverized to obtain a pulverized product. When the fired product is pulverized, the fired product is pulverized in an organic solvent using a bead mill. The bead mill is an apparatus for pulverizing and dispersing inorganic powder, and includes a pulverizing chamber and a rotor (agitator) provided in the pulverizing chamber. The space between the inner wall of the pulverizing chamber and the rotor is filled with a large number of pulverizing media. Small diameter beads made of ceramics such as zirconium oxide are used as the pulverizing media. When pulverizing is carried out in wet pulverization, the pulverizing solvent is charged into the pulverizing chamber together with the treated powder. At the time of pulverizing, the treated powder is charged into the pulverizing chamber and the rotor is rotated at a high speed. When the rotor is rotated at high speed, beads are stirred. Accordingly, the beads collide with other beads, the inner wall of the pulverizing chamber and the rotor at high speed. Thus, a strong impact force and shearing force are applied to the treated powder existing between one bead and another bead or between beads and the inner wall of the pulverizing chamber, thereby pulverizing the treated powder. In the beed mill, the diameter of the pulverizing media is smaller and the pulverizing media moves at a higher speed than other pulverizing devices such as a ball mill. Therefore, it is an effective technique for refinement of treated powder.

The pulverizing by the bead mill includes dry treatment and wet treatment. In this embodiment, a wet treatment is carried out in an organic solvent. The treated powder is made to be finer in wet pulverizing than in dry pulverizing. This is because the agglomeration of the treated powder is unavoidable in dry pulverization, and the impact force and the shearing force are not effectively applied to the individual particles during pulverization. Furthermore, even in the wet pulverizing, pulverizing in water is not preferable. This is because the lithium (Li) component contained in the fired product as the treated powder dissolves and comes out into water. A technique for drying the whole amount of the treated powder after pulverizing is also conceivable, but in this case, the lithium (Li) component is segregated in the pulverized product after drying, and a garnet-type composite oxide having a uniform composition cannot be obtained. On the other hand, by carrying out pulverization using a bead mill in an organic solvent, dissolution of the lithium (Li) component from the pulverized product can be prevented, and a fine pulverized product having a uniform composition can be obtained.

The organic solvent is preferably at least one selected from the group consisting of alcohol solvents such as methanol, ethanol, butanol, hexanol, benzyl alcohol and isopropyl alcohol (IPA); ketone solvents such as acetone, methyl ethyl ketone, methyl isobutyl ketone and cyclohexanone; ester solvents such as methyl acetate, ethyl acetate and butyl acetate; glycol ether solvents such as propylene glycol monomethyl ether, ethylene glycol monoethyl ether, ethylene glycol monobutyl ether, 3-methoxy-3-methyl-1-butanol and diethylene glycol monobutyl ether; hydrocarbon solvents such as benzene, toluene, xylene, cyclohexane, methyl cyclohexane, ethyl cyclohexane, mineral oil, normal paraffin and isoparaffin; ether solvents such as 1,3-dioxolane, 1,4-dioxane and tetrahydrofuran; glycol solvents such as ethylene glycol, diethylene glycol, propylene glycol, and polyethylene glycol; amine solvents such as monoethanolamine, diethanolamine, triethanolamine, n-methyl-2-pyrrolidone, 2-amino-2-methyl-1-propanol, and N,N-dimethylformamide, and isopropyl alcohol (IPA) and/ or toluene is particularly preferred, and toluene is most preferable. When water having a strong hydrophilicity is used, lithium (Li) may dissolve and the crystallinity of LLZO constituting the fired product may be broken. However, since the above organic solvents have a strong hydrophobicity, lithium (Li) is hardly dissolved and the crystallinity of LLZO is easily maintained. Further, the generation of the impurity phase can be further suppressed by using toluene as the organic solvent.

<Heat-Treatment Step>

In the heat-treatment step, the obtained pulverized product is heat-treated to obtain a heat-treated product. The pulverized product after the pulverization step includes crystal strain generated by the pulverization step. The pulverized product including crystal strain has low crystallinity and is inferior in terms of characteristics such as ionic conductivity. The composite oxide powder having fine and high characteristics can be obtained by recovering the crystallinity in the heat treatment step. In order to recover the crystallinity, it is effective to carry out the heat treatment at a certain high temperature for a long time. Therefore, the heat-treatment temperature is preferably 200° C. or more, more preferably 300° C. or more, and further preferably 400° C. or more. Furthermore, retention time of the heat-treatment is preferably 0.5 hours or more, more preferably 1 hour or more, and further preferably 1.5 hours or more. On the other hand, when heat-treatment is carried out excessively, the grain growth of the pulverized product proceeds, and the obtained composite oxide powder may become coarse. Therefore, the heat-treatment temperature is preferably 1000° C. or less, more preferably 900° C. or less, and further preferably 800° C. or less. Furthermore, the retention time is preferably 4 hours or less, more preferably 3 hours or less, and further preferably 2 hours or less. The heat-treatment atmosphere is not particularly limited as long as the garnet-type structure is maintained. However, the atmosphere is preferably oxygen-containing atmosphere such as the atmospheric air or an oxygen atmosphere, and particularly preferably atmospheric air.

The method of this embodiment makes is possible to produce excellent composite oxide powder being fine and having fewer hetero-phases, and having high crystallinity. When such excellent composite oxide is used, solid electrolyte being dense and having high ionic conductivity can be produced.

Method for Producing Solid Electrolyte

A method for producing a solid electrolyte of this embodiment includes: preparing composite oxide powder (a composite oxide powder preparing step); molding the composite oxide powder to obtain a molded body (a molding step); and firing the molded body to obtain a sintered body (a main-firing step). Furthermore, in preparing the composite oxide powder, the composite oxide powder is produced by the above-described method. Hereinafter, detail of each step will be described.

<Composite Oxide Powder Preparing Step>

Firstly, a composite oxide powder is prepared. At this time, the composite oxide powder is produced by the above-described method.

<Molding Step>

In the molding step, the obtained composite oxide powder is molded into a molded body. Molding may be carried out by any well-known techniques used in the field of ceramics production. Examples of such techniques include press molding, a doctor blade method, and the like.

<Main-Firing Step>

In the main-firing step, the obtained molded body is fired (main-firing) to obtain a sintered body. The main-firing may be carried out by any well-known techniques used in the field of ceramics production. Examples of such techniques include a technique of retaining the molded body at 1000° C. to 1300° C. for 10 hours to 20 hours. However, it is preferable to fire the molded body in the state of being embedded in LLZO powder. This can prevent volatilization of the lithium (Li) component from the molded body.

The obtained sintered body may be processed as necessary. The processing may be carried out by any known techniques used in the field of ceramics production. Examples of such techniques include a technique of polishing, pulverizing, or cutting sintered body.

Thus, the solid electrolyte can be obtained. The solid electrolyte is dense and has excellent ionic conductivity. Therefore, the solid electrolyte is useful as a solid electrolyte for a lithium-ion secondary battery, an oxygen sensor, or an electric double layer capacitor.

Method for producing Lithium-Ion Secondary Battery A method for producing a lithium-ion secondary battery of this embodiment includes: preparing at least an exterior material, a positive electrode, a negative electrode, and a solid electrolyte; and disposing the positive electrode and the negative electrode in the exterior material such that the positive electrode and the negative electrode face each other, and disposing a solid electrolyte between the positive electrode and the negative electrode. Furthermore, in preparing the solid electrolyte, the solid electrolyte is produced by the above-mentioned method.

Well-known materials used for lithium-ion secondary batteries can be used as the exterior material, the positive electrode, and the negative electrode. For example, as the exterior material, a container such as a metal or resin can be used. Furthermore, as the positive electrode, a positive electrode active material including manganese oxide, lithium manganese composite oxide, lithium nickel composite oxide, or lithium cobalt composite oxide applied to a positive electrode current collector can be used. Furthermore, as the negative electrode, a negative electrode active material including metal lithium or a lithium compound applied to the negative electrode current collector can be used.

The lithium-ion secondary battery of this embodiment includes a solid electrolyte being dense and having excellent ionic conductivity, and therefore has high output.

EXAMPLES

This embodiment will be described more specifically with reference to the following EXAMPLES. However, the present invention is not necessarily limited to the following EXAMPLES.

Example 1

In EXAMPLE 1, for Al-doped LLZO, starting materials were mixed and fired to produce a fired product. Herein, effect of types of the starting materials and the firing conditions were examined.

(1) Production of Fired Products

Example 1-1 (Reference Example)

<Raw Material Mixing Step>

As starting materials, powder of each of lithium carbonate ($Li_2CO_3$), lanthanum oxide ($La_2O_3$), zirconium oxide ($ZrO_2$), and aluminum oxide ($Al_2O_3$) was prepared. Then, the starting materials were blended so that a lithium source (lithium carbonate) becomes an excess of 6 mass % with respect to the target composition ($Li_{6.25}Al_{0.25}La_3Zr_2O_{12}$). Then, the blended starting materials were mixed in an alumina mortar. In the mixing, isopropyl alcohol (IPA) was added to the starting materials.

<Firing Step>

The obtained mixture was placed in an alumina crucible and fired (pre-fired) to obtain a fired product (pre-fired product). At this time, a firing was carried out under the conditions at 1000° C. for 12 hours once.

Example 1-2 (Reference Example)

Firing was carried out twice in the firing step. Except for the above, a fired product was produced in the same manner as in example 1-1.

Example 1-3 (Reference Example)

In the raw material mixing step, lithium hydroxide monohydrate ($LiOH \cdot H_2O$) was used instead of lithium carbonate ($Li_2CO_3$) as the lithium source. Except for the above, a fired product was produced in the same manner as in example 1-1.

Example 1-4 (Reference Example)

In the firing step, firing was carried out twice. Except for the above, a fired product was produced in the same manner as in example 1-3.

(2) Evaluation

Examples 1-1 to 1-4 were evaluated for various properties.

<X-Ray Diffraction>

The obtained fired product was analyzed by a powder X-ray diffraction method to identify a crystal phase in the fired product. The analysis conditions are as follows.

X-ray diffraction apparatus: Bruker D2 Phaser
Radiation source: CuKα line
Tube voltage: 30 kV
Tube electric current: 10 mA
Scanning speed: 2.4°/min
Scanning range (2θ): 10 to 70°

<SEM Observation>

The fired product was observed using a scanning electron microscope (SEM: SIRION manufactured by FEI). Observation was carried out under the conditions at a magnification of 2000 times or 20000 times.

(3) Evaluation Result

Figure 2:
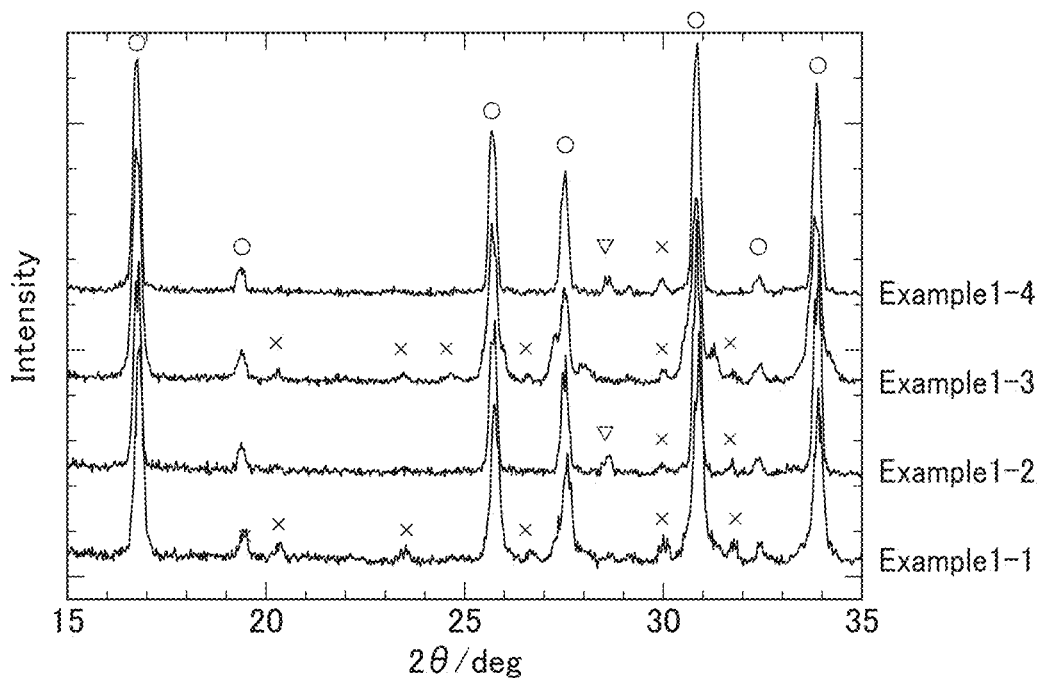
FIG. 2 is an enlarged view showing the X-ray diffraction profiles of the fired products.

FIGS. 1 and 2 show the X-ray diffraction patterns of the fired products of examples 1-1 to 1-4. Note here that FIG. 2 is an enlarged view of FIG. 1. In FIGS. 1 and 2, a circle symbol (o) indicates a diffraction line of a cubic garnet phase (LLZO), an inverted triangle symbol (V) indicates a diffraction line of a pyrochlore phase ($La_2Zr_2O_7$), and a cross symbol (x) indicates a diffraction line of an impurity phase.

As shown in FIG. 1, in all samples (examples 1-1 to 1-4), a cubic garnet-type compound (indicated by a circle symbol (○) in the figure) was generated as a main phase. Samples that had been fired once (examples 1-1 and 1-3) included impurity phases (indicated by a cross symbol (x) in the figure). On the other hand, in samples that had been fired twice (examples 1-2 and 1-4), in addition to narrowing of the XRD peak and reduction of background noise, the impurity phases (indicated by a cross symbol (x) in the figure) disappeared, and a small amount of pyrochlore phases (an inverted triangle symbol (∇) in the figure) was generated. The impurity phase (indicated by a cross symbol (x) in the figure) is a phase including excessively added lithium (Li), and the pyrochlore phase is assumed to have occurred as a result of volatilization of lithium (Li) by the firing twice. Therefore, in order to obtain a cubic garnet-type single phase by firing twice, it is considered to be appropriate to set the amount of excess lithium (Li) source added to about 8 mass % at the time of blending. Furthermore, the sample (example 1-2) prepared using lithium carbonate ($Li_2CO_3$) as the lithium (Li) source included a smaller amount of impurity phases as compared with the sample (example 1-4) prepared using lithium hydroxide monohydrate ($LiOH \cdot H_2O$).

Figure 3:
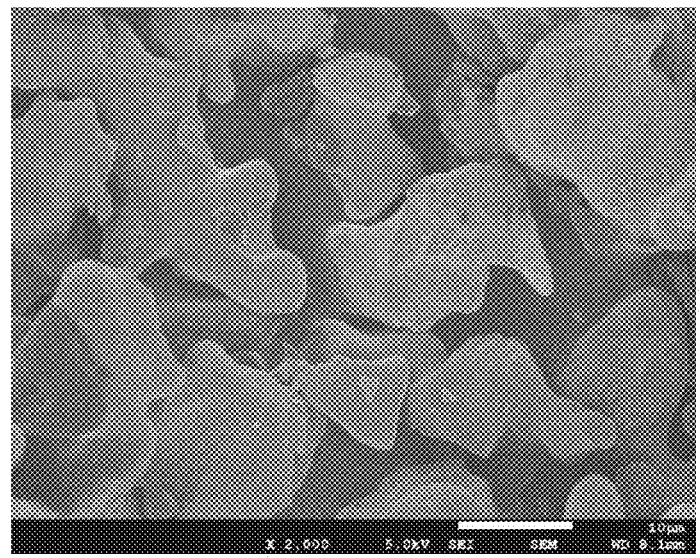
FIG. 3 is a view showing a SEM image of a fired product.
Figure 4:
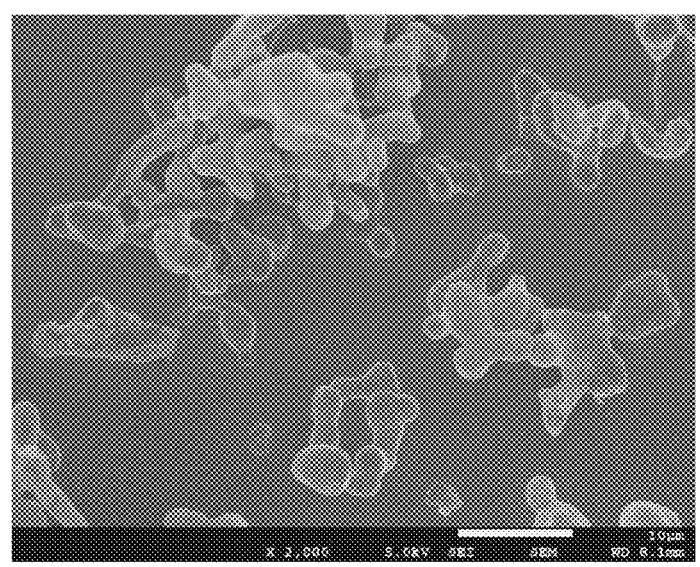
FIG. 4 is a view showing a SEM image of a fired product.

FIG. 3 and FIG. 4 show SEM photographs of example 1-2 and example 1-4, respectively. From the SEM photographs, the effect of microstructure by difference of the lithium (Li) source was observed. Specifically, the sample (example 1-2) prepared using lithium carbonate ($Li_2CO_3$) showed a structure in which angular particles of about 10 μm in size were fused on the surface (FIG. 3). On the other hand, a sample (example 1-4) prepared using lithium hydroxide monohydrate ($LiOH \cdot H_2O$) showed a structure in which small spherical particles having a diameter of 2 to 3 μm were fused (FIG. 4). Example 1-2 is considered to have a shape that more clearly reflects the characteristics of cubic crystals. Details of the cause of the difference in the microstructure are not known, but it is considered to be related to the melting point of the lithium source ($Li_2CO_3$: 723° C., LiOH: 462° C.)

From these results, in order to produce a cubic garnet-type LLZO compound having high purity, it is considered to be preferable to use lithium carbonate ($Li_2CO_3$) as the lithium (Li) source, to set the amount of excess lithium (Li) added (blended amount) to about 6 mass %, and to carry out firing at 1000° C. for 12 hours twice.

Example 2

In EXAMPLE 2, a composite oxide powder was prepared by pulverizing and heat-treating a fired product of Al-doped LLZO, and effects of pulverizing conditions and heat-treating conditions were examined.
(1) Production of Composite Oxide Powder Example 2-1 (Comparative Example)

<Pulverizing Step>
The fired product obtained in example 1-2 of EXAMPLE 1 was pulverized in water ($H_2O$) using a wet bead mill. The pulverization conditions include pulverizing chamber capacity of 1.2 L, pulverizing medium of zirconia beads (0.8 mmφ), bead filling rate of 80% by volume, agitator tip speed of 10 m/sec, and flow rate of 1500 mL/min. The pulverized solvent (water) was added in an amount (20 L) of 20 mass % of the fired product. The pulverizing time was 0.5, 1.0 or 2.0 hours. Thus, a pulverized product was obtained. Note here that when pulverization was carried out in water ($H_2O$), because the pulverized product significantly agglomerated during the pulverization of 2.0 hours, pulverization exceeding 2.0 hours was not carried out.
<Heat-Treatment Step>
The obtained pulverized product was subjected to heat-treatment to obtain a composite oxide powder. The heat-treatment was carried out under the conditions at 700° C. for 4 hours.

Example 2-2 (Example)

Pulverization of the fired product was carried out in isopropyl alcohol (IPA) for 0.5, 1.0, 2.0, or 4.0 hours, and heat-treatment was carried out under the conditions at 400° C. for 2 hours. Except for the above, composite oxide powders were produced in the same manner as in example 2-1.

Example 2-3 (Example)

Pulverization of the fired products was carried out in toluene for 4.0 hours, and heat-treatment was carried out under the conditions at 400° C. for 2 hours. A composite oxide powder was produced in the same manner as in example 2-1 except for the above.
(2) Evaluation
Examples 2-1 to 2-3 were evaluated for various characteristics as follows.
<X-Ray Diffraction>
The obtained pulverized products and composite oxide powders were analyzed by the powder X-ray diffraction method to identify a crystal phase. Analysis conditions were the same as in Example 1.
<Particle Size Distribution>
The particle size distribution of the composite oxide powders was obtained by optical particle size distribution measurement. The measurement was carried out as follows. A powder sample was placed in purified water, dispersed in an ultrasonic disperser for 5 minutes, followed by measurement using a laser diffraction type particle size distribution measuring device (SALD-1100 manufactured by Shimadzu Corporation).
<SEM Observation>
The pulverized products and the composite oxide powders were observed using a scanning electron microscope (SEM; SIRION manufactured by FEI).
(3) Evaluation Result
FIGS. 5(a) to (f) show SEM photographs of the pulverized products of example 2-1 and example 2-2. Herein, (a), (b) and (c) are SEM photographs of the sample (example 2-2) pulverized in isopropyl alcohol (IPA) for 0.5, 1.0 or 2.0 hours, respectively. Furthermore, (d), (e) and (f) are SEM photographs of the sample (example 2-1) pulverized in water ($H_2O$) for 0.5, 1.0 or 2.0 hours, respectively.

Figure 5A:
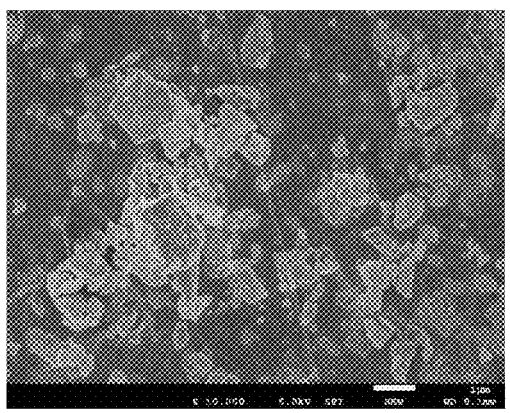
FIGS. 5(a)-5(f) are views showing SEM images of a pulverized product.
Figure 5B:
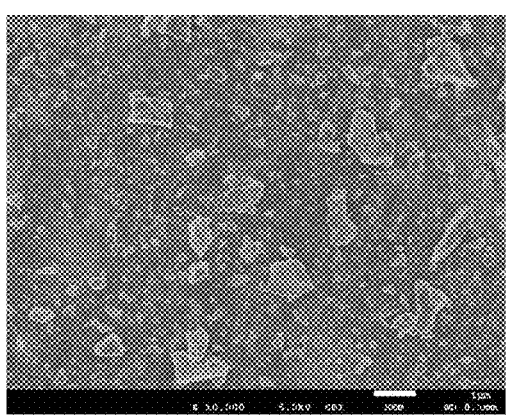
Figure 5C:
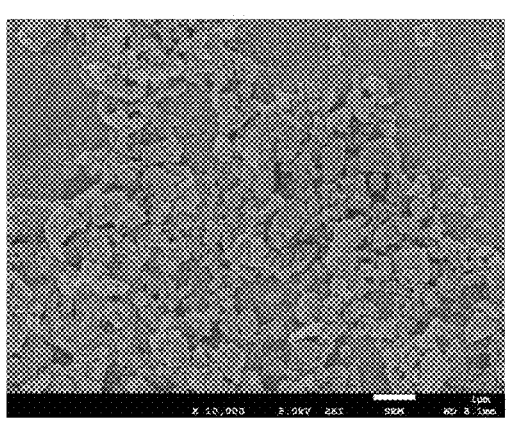
Figure 5D:
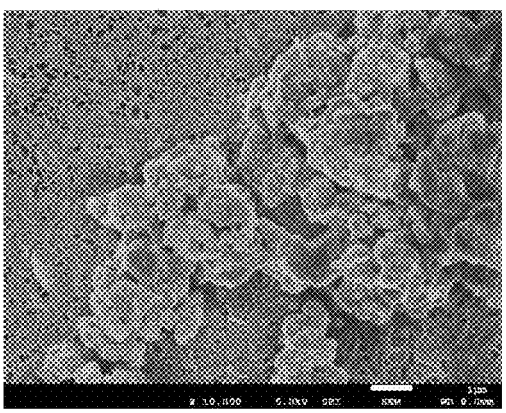
Figure 5E:
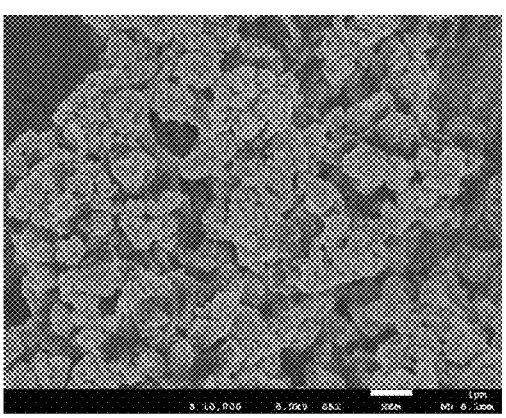
Figure 5F:
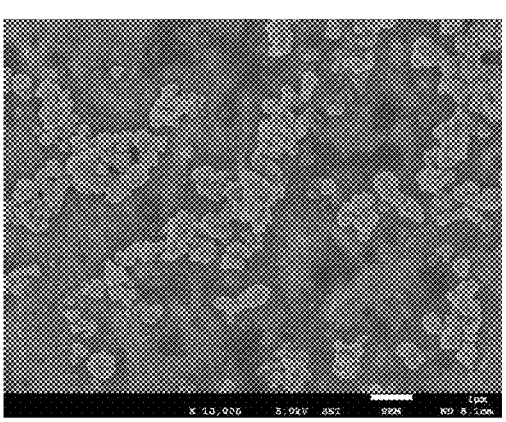

As shown in FIGS. 5(a) to (f), the sample pulverized in isopropyl alcohol (IPA) (example 2-2) was pulverized to particles of about 1 μm or less after treatment for 0.5 hours (FIG. 5(a)). By setting the treatment time to 1.0 hour and 2.0 hours, it seems that the pulverization further proceeded (FIGS. 5(b) and (c)). On the other hand, in the samples pulverized in water ($H_2O$) (example 2-1), although pulverization proceeded to about 1 μm, the particle size was slightly larger as compared with the case where pulverization was carried out in IPA. Furthermore, agglomeration of pulverized particles is seen (FIGS. 5(d) to (f)).

Figure 6:
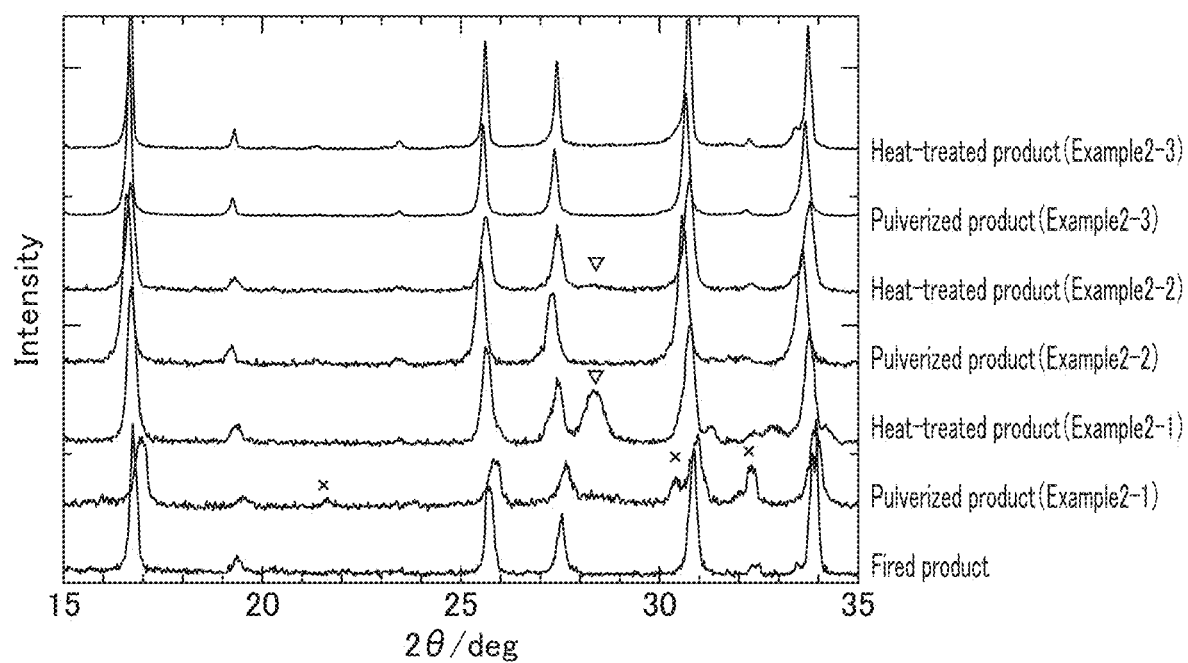
FIG. 6 is a view showing X-ray diffraction profiles of fired products, pulverized products, and heat-treated products.

FIG. 6 shows the X-ray diffraction patterns of the fired products, the pulverized products, the heat-treated products (composite oxide powder) of examples 2-1 to 2-3. crystal from which lithium (Li) was dissolved out by heat treatment. In fact, it has been demonstrated that water ($H_2O$) used as a solvent showed strong alkalinity after pulverization, supporting the elution of lithium (Li).

In the sample (example 2-2) pulverized in isopropyl alcohol (IPA), the diffraction angle (2θ) of the (211) diffraction line was 16.74° in the stage of the fired product, while the diffraction angle was 16.58° in the stage of the pulverized product. This shows that the peak shifted to the low angle side by pulverization, and the lattice expanded. No new impurities occurred. In the composite oxide powder obtained by heat-treating the impurity, the diffraction angle of the (211) diffraction line was 16.68°, and the shift of the peak was relaxed. Although the pyrochlore phase was found to be generated, the content ratio estimated from the peak intensity ratio of the X-ray diffraction was as small as about 3 mass %. In addition, the peak half width of the (211) diffraction line was 0.25°.

The sample (example 2-3) pulverized in toluene for 4 hours maintained the cubic garnet-type structure. Furthermore, the diffraction line was slightly shifted to the low angle side, showing that the lattice expanded. By subjecting the pulverized product to heat-treatment at 400° C. for two hours, the shift of the diffraction line was no longer seen, and the impurity phase such as pyrochlore did not occur in pulverization in toluene.

From the above results, it is considered that when pulverization is carried out using water ($H_2O$) as the solvent, lithium (Li) ions in LLZO dissolves into water and the crystal lattice contracts. It is considered that lithium (Li) ions do not completely return to the crystal lattice in the subsequent heat treatment, and the lithium (Li) ions thus dissolved crystallize as the pyrochlore phase ($La_2Zr_2O_7$). On the other hand, when pulverization treatment was carried out in an organic solvent such as isopropyl alcohol (IPA) or toluene, the crystal lattice slightly expanded after the pulverization treatment and returned to the original state by heat treatment. Although the detailed mechanism is unknown, it is considered that the function of solvents in the pulverization treatment is important.

Figure 7:
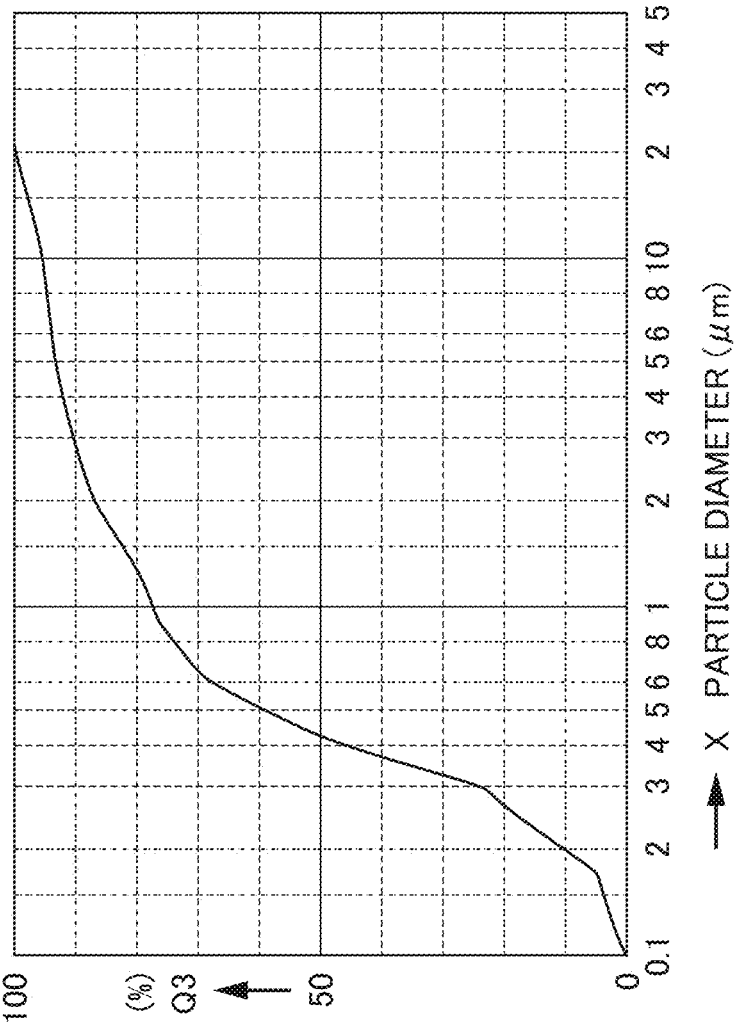
FIG. 7 is a view showing particle size distribution of a heat-treated product (a composite oxide powder)

FIG. 7 shows the particle size distribution of the heat-treated product (pulverized for 2 hours and heat-treated at 700° C. for 4 hours) for example 2-2 produced by pulverizing in IPA. The 50% diameter (D50) was 0.4 μm, and about 80% of the particles had a particle size of 1 μm or less.

Example 3

In EXAMPLE 3, for Al-doped LLZO, a composite oxide powder was produced, and the composite oxide powder was molded and main-fired to produce a sintered body (a solid electrolyte). Then, the evaluation of the sintering property and the ionic conductivity was carried out.

(1) Production of Sintered Body

Example 3-1 (Example)

<Raw Material Mixing Step>

As starting materials, powder of each of lithium carbonate ($Li_2CO_3$), lanthanum oxide ($La_2O_3$), and zirconium oxide ($ZrO_2$) was prepared. The starting materials were blended so that an aluminum (Al) doped amount x became 0.3 and the excess addition amount of the lithium source (lithium carbonate) became 10 mass % in the composition represented by the formula: $Li_{7-3x}Al_xLa_3Zr_2O_{12}$. Then, the blended starting materials were mixed in an alumina mortar. In mixing, isopropyl alcohol (IPA) was added to the starting materials.

<Firing Step>

The obtained mixture was placed in an alumina crucible and fired to produce a fired product. The firing was carried out at 900° C. for 12 hours once and at 1035° C. for 12 hours once.

<Pulverizing Step>

The obtained fired product was pulverized in isopropyl alcohol (IPA) using a wet bead mill. Zirconia beads (0.8 mmφ) were used as pulverizing media. The pulverizing time was 4.0 hours. Thus, the pulverized product was obtained.

<Heat-Treatment Step>

The obtained pulverized product was heat-treated. The heat-treatment was carried out under the conditions at 400° C. for 2 hours. Thus, a composite oxide powder was obtained. The obtained composite oxide powder had a particle diameter of 0.3 to 0.5 μm (D50 was 0.41 μm).

<Molding Step>

The obtained composite oxide powder was press-molded. Molding was carried out using a die having a diameter of 17 mm under the conditions at 200 MPa. Thus, a disk-shaped molded body was obtained.

<Main-Firing Step>

The obtained molded product in the state of being embedded in LLZO powder was placed in an alumina crucible, followed by main-firing thereof. The main firing was carried out under the conditions at 1150° C. or 1250° C. for 12 hours. Thus, a sintered body was obtained.

Example 3-2 (Example)

The pulverization time was set to 3 hours, and the heat-treatment was carried out under conditions at 800° C. for three hours. Except for the above, a composite oxide powder and a sintered body were produced in the same manner as in example 3-1.

Example 3-3 (Comparative Example)

The fired product was not subjected to pulverization treatment and the heat-treatment. Except for the above, a composite oxide powder and a sintered body were produced in the same manner as in example 3-1. The obtained composite oxide powder had a particle diameter of 1 to 10 μm.

Example 3-4 (Comparative Example)

The starting materials were blended so that the aluminum (Al) doped amount x became 0.25. Except for the above, a composite oxide powder and a sintered body were produced in the same manner as in example 3-3. The obtained composite oxide powder had a particle diameter of 1 to 10 μm.

(2) Evaluation

Examples 3-1 to 3-4 were evaluated for various characteristics as follows.

<X-Ray Diffraction>

The obtained fired product and pulverized product were analyzed by the powder X-ray diffraction method to identify a crystal phase. Analysis conditions were the made to be the same as in EXAMPLE 1.

<Appearance Observation>

The appearance of the sintered body was observed by visual observation.

<Density of Sintered Bodies>

Dimensions (diameter, thickness) and mass of the sintered body were measured to calculate the density. A relative density was also obtained using the theoretical density of LLZO (5.14 $g/cm^3$).

<Ionic Conductivity>

The ionic conductivity of the sintered body by the AC impedance method. Firstly, both surfaces of the sintered body were polished, and gold was vapor-deposited by sputtering film formation to produce a measurement sample. The measurement was carried out at room temperature using an impedance analyzer (1260A manufactured by Solartron).

(3) Evaluation Result

Figure 8:
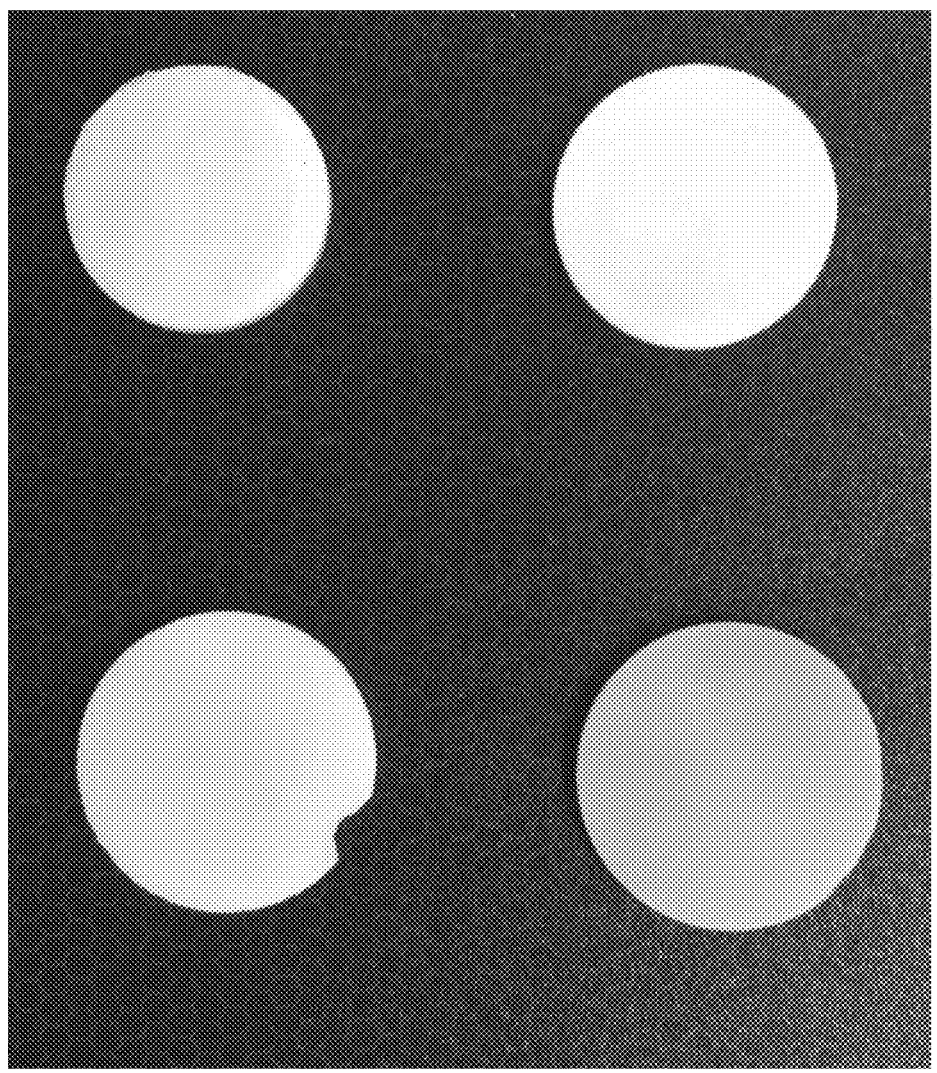
FIG. 8 is a view showing a photograph of appearances of sintered bodies (solid electrolytes)

FIG. 8 shows a photograph of appearances of each sintered body produced under the conditions of the firing temperature of 1250° C. for example 3-1 to example 3-4. The sintered body of Example 3-1 was substantially white, but those of example 3-2, example 3-3, and example 3-4 were colored with beige-tinged color in this order.

Table 1 shows the density and the relative density of each sintered bodies produced under the conditions of the firing temperature of 1150° C. or 1250° C. for example 3-1 to example 3-4. As shown in Table 1, in comparison at the same firing temperature, example 3-1 and example 3-2 using fine particles as raw material have higher density and sintered densely as compared with example 3-3 and example 3-4 using particles having a particle diameter of several μm as a raw material.

TABLE 1

Density and relative density of sintered body

| Sample | Firing condition | Density (g/cm$^3$) | Relative density (%) |
|---|---|---|---|
| Example 3-1 | 1250° C. × 12 hrs | 4.67 | 91 |
| Example 3-2 | 1250° C. × 12 hrs | 4.65 | 91 |
| Example 3-3* | 1250° C. × 12 hrs | NA | NA |
| Example 3-4* | 1250° C. × 12 hrs | 4.45 | 87 |
| Example 3-1 | 1150° C. × 12 hrs | 4.34 | 84 |
| Example 3-2 | 1150° C. × 12 hrs | NA | NA |
| Example 3-3* | 1150° C. × 12 hrs | 3.34 | 65 |
| Example 3-4* | 1150° C. × 12 hrs | 3.56 | 69 |

Note 1)
"*" represents Comparative Example.
Note 2)
"NA" means not available.

Figure 9:
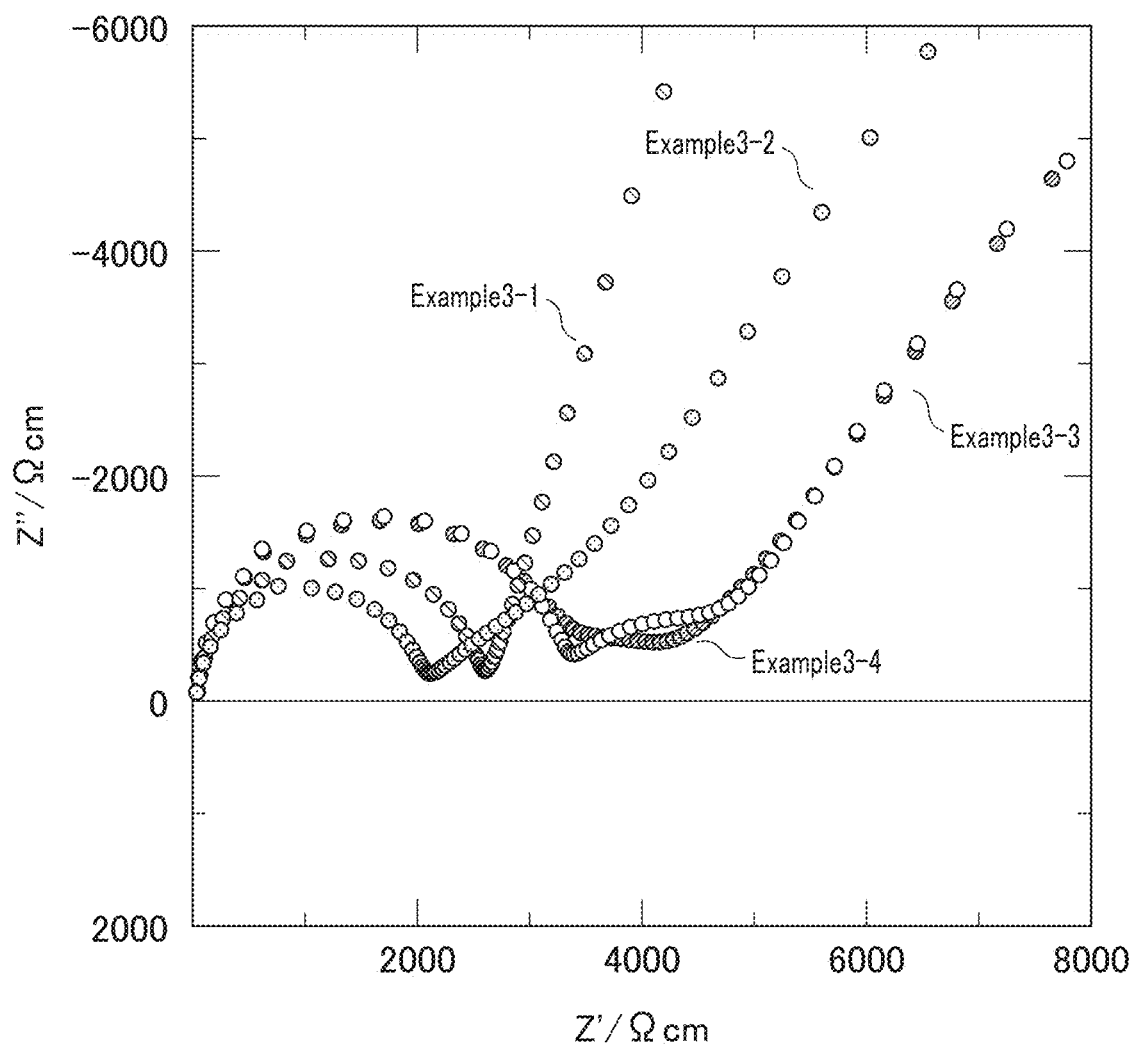
FIG. 9 is a view showing Nyquist plots of AC impedance of the sintered bodies (solid electrolytes)

FIG. 9 shows Nyquist plots of AC impedance of the sintered bodies produced under the conditions at the firing temperature of 1250° C. for example 3-1 to example 3-4. As shown in FIG. 9, in example 3-1 and example 3-2 in which powder having been made fine was fired, due to the bulk resistance, semicircles on the left side (high frequency side) are smaller as compared with those in example 3-3 and example 3-4. Thus, it is shown that by firing the powder having been made fine, the ionic conductivity of the bulk was improved. The bulk ionic conductivity calculated from the impedance result were $3.8 \times 10^{-4}$ Scm$^{-1}$ in example 3-1, $4.7 \times 10^{-4}$ Scm$^{-1}$ in example 3-2, $2.9 \times 10^{-4}$ Scm$^{-1}$ in example 3-3, and $2.8 \times 10^{-4}$ Scm$^{-1}$ in example 3-4.

As shown in FIG. 9, example 3-3 and example 3-4 clearly show the second semicircle by grain boundary resistance, while example 3-1 and example 3-2 do not clearly show the second semicircle. Thus, example 3-1 and example 3-2 show that the grain boundary resistance was small.

Example 4

In EXAMPLE 4, for Ga-doped LLZO, starting material were mixed and fired to produce a fired product, and further pulverization and heat-treatment of the fired product were carried out to produce a composite oxide powder.

(1) Production of Composite Oxide Powder

Example 4-1 (Example)

<Raw Material Mixing Step>

As the starting material, powder of each of lithium carbonate ($Li_2CO_3$), lanthanum oxide ($La_2O_3$), zirconium oxide ($ZrO_2$), and gallium oxide ($Ga_2O_3$) was prepared. In the composition represented by the formula: $Li_{7-3x}Ga_xLa_3Zr_2O_{12}$, the starting materials were blended so that the gallium (Ga) amount x became 0.3 and the excess addition amount of the lithium source (lithium carbonate) became 10 mass %. Then, the blended starting materials were mixed in an alumina mortar. Isopropyl alcohol (IPA) was added to the starting material during mixing.

<Firing Step>

The obtained mixture was placed in an alumina crucible and fired to produce a fired product. In firing, firing was carried out at 900° C. for 12 hours once, then the fired mixture was pulverized and wet-mixed, and further firing was carried out at 1035° C. for 12 hours once. Thus, Ga-LLZO powder (fired product) having a $Li_{6.1}Ga_{0.3}La_3Zr_2O_{12}$ composition was obtained.

<Pulverizing Step>

The obtained Ga-LLZO powder was pulverized. Pulverization was carried out in isopropyl alcohol (IPA) using a wet-type bead mill. Zirconia beads (0.8 mmφ) were used as pulverizing media, and the pulverizing time was 4.0 hours. After pulverization, drying was carried out to obtain Ga-LLZO-S (pulverized product) that had been made into fine particles.

<Heat-Treatment Step>

The obtained Ga-LLZO-S was subjected to heat-treatment at 800° C. for two hours to obtain a composite oxide powder.

Example 4-2 (Example)

The heat-treatment was carried out under the conditions at 400° C. for 2 hours. Except for the above, a composite oxide powder was produced in the same manner as in example 4-1.

Example 4-3 (Comparative Example)

Heat-treatment of the pulverized product was not carried out. Except for the above, a composite oxide powder was produced in the same manner as in example 4-1.

Example 4-4 (Comparative Example)

Pulverization and heat-treatment of the fired product were not carried out. Except for the above, a composite oxide powder was produced in the same manner as in example 4-1.

(2) Evaluation

Example 4-1 to example 4-4 were evaluated for various properties in the same manner as in example 2-1 to example 2-3.

(3) Evaluation Result

Figure 10:
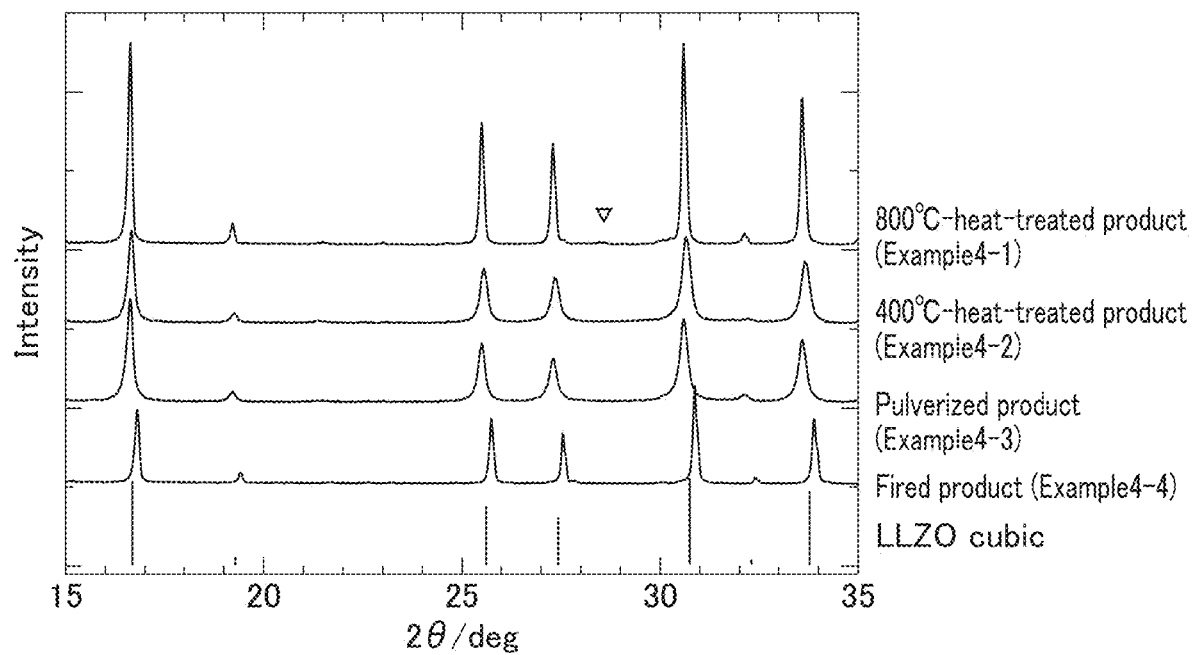
FIG. 10 is a view showing X-ray diffraction profiles of a fired product, a pulverized product, and heat-treated products.

FIG. 10 shows X-ray diffraction patterns of example 4-1 to example 4-4. As shown in FIG. 10, all samples showed diffraction patterns of the cubic garnet-type crystal structure. The diffraction line derived from a pyrochlore phase ($La_2Zr_2O_7$) (indicated by a black inverted triangle symbol (▼) in the figure) was slightly observed only in the 800° C.—heat-treated product (example 4-1). In the pulverized product (example 4-3), the diffraction line was shifted to the low-angle side. This shows expansion of the lattice. Furthermore, in the pulverized product (example 4-3) and 400° C.-heat-treated product (example 4-2), the width of the diffraction line increased. This shows that the crystal grain became finer. On the other hand, in the 800° C.-heat-treated product (example 4-1), the width of the diffraction line was somewhat reduced due to the growth of crystallite.

Figure 11A:
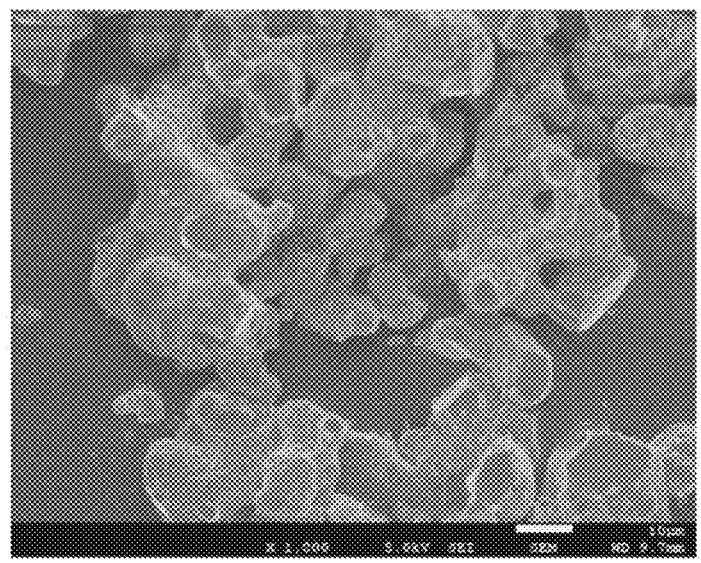
FIGS. 11(a)-11(b) are views showing SEM images of the fired product and the heat-treated product.
Figure 11B:
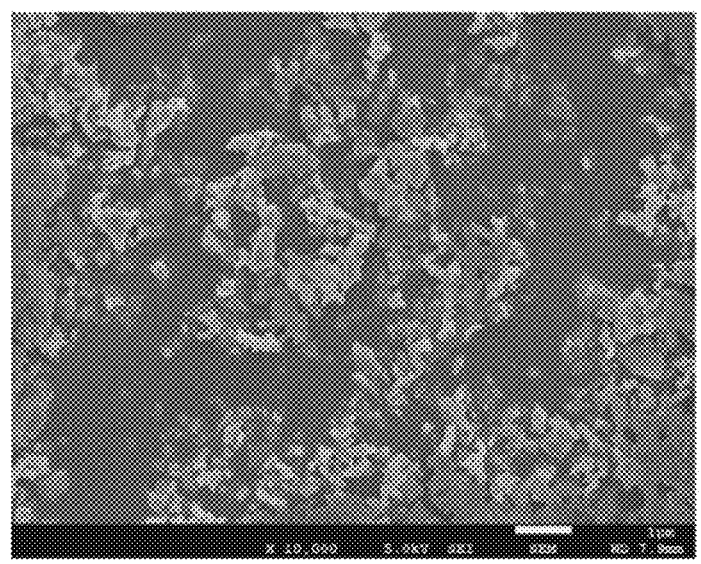

FIGS. 11(a) and (b) show SEM photographs of the fired product (example 4-4) and the 400° C.-heat-treated product (example 4-2). Herein, FIG. 11(a) shows an SEM photograph at a magnification of 1,000 times, and FIG. 11(b) shows an SEM photograph at a magnification of 10,000 times. In the fired product (example 4-4), a diameter of the particle was about 10 μm, while in the sample in which the fired product treated with bead mill and further heat-treated at 400° C. (example 4-2), the particle was pulverized to be 1 μm or less.

Figure 12:
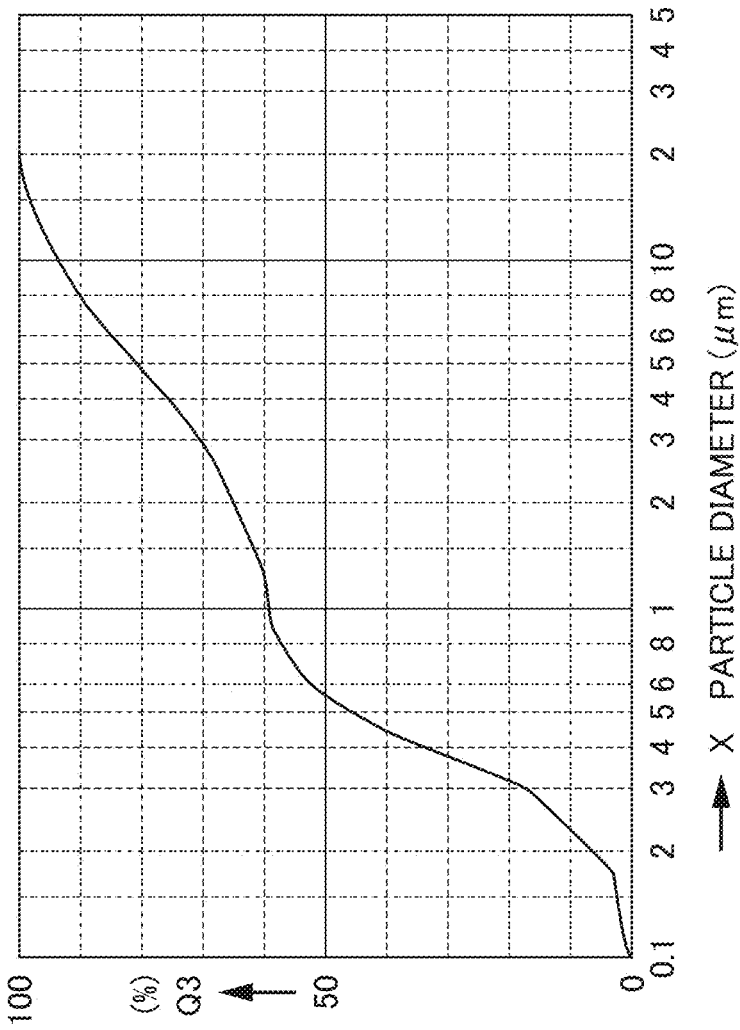
FIG. 12 is a view showing particle size distribution of the heat-treated product (composite oxide powder)

FIG. 12 shows a measurement result of a grain size distribution measurement method of the 400° C.-heat-treated product (example 4-2). The average particle diameter D50 was 0.56 μm (560 nm). In the particle size distribution, two peaks were observed around 0.3 μm and 2 μm. Since no single particle with 1 μm or more was observed in the SEM photograph, it is considered that a peak around 2 μm was observed due to the aggregation of the fine particles.

Example 5

In EXAMPLE 5, for Ga-doped LLZO, a fired product or a heat-treated product (a composite oxide powder) was formed and main-fired to produce a sintered body (a solid electrolyte). Then, evaluation of the sintering property and the ionic conductivity was carried out.
(1) Production of Sintered Bodies Example 5-1 (Example)

The 400° C.-heat-treated product produced in EXAMPLE 4 (example 4-2) was used to produce a sintered body. The sintered body was produced as follows. Firstly, the heat-treated product was press-molded in a disk shape having a diameter of about 20 mm, and thickness of 1.5 mm. Then, the obtained molded body was placed in an aluminum crucible in a state of being embedded in mother powder, and this was subjected to main firing. The main-firing was carried out under the conditions at 1250° C. for 12 hours. Thus, a sintered body was obtained.

Example 5-2 (Comparative Example)

A sintered body was produced in the same manner as in example 5-1 except that the fired product (example 4-4) was used instead of the 400° C.-heat-treated product.
(2) Evaluation Example 5-1 and example 5-2 were evaluated for various properties in the same manner as in example 3-1 to example 3-4.
(3) Evaluation Result Table 2 shows the densities and the ionic conductivities of the sintered bodies for example 5-1 and example 5-2. Note here that Table 2 shows also results of example 3-2 and example 3-4 obtained for the Al-doped LLZO. Even when any one of the fired product and the heat-treated product was used for raw materials, Ga-doped LLZO (example 5-1 and example 5-2) had higher densities and ionic conductivities of the sintered bodies as compared with those of the Al-doped LLZO (example 3-2 and example 3-4).

TABLE 2

Density and relative density of sintered body

| Sample | Raw material powder | Firing condition | Density (g/cm$^3$) | Ionic conductivity (Scm$^{-1}$) |
|---|---|---|---|---|
| Example 3-2 | Al-doped LLZO 800° C.-heat-treated product | 1250° C. × 12 hrs | 4.65 | 4.7 × 10$^{-4}$ |
| Example 3-4 | Al-doped LLZO fired product | 1250° C. × 12 hrs | 4.45 | 2.8 × 10$^{-4}$ |
| Example 5-1 | Ga-doped LLZO 400° C.-heat-treated product | 1250° C. × 12 hrs | 4.85 | 1.1 × 10$^{-3}$ |
| Example 5-2 | Ga-doped LLZO fired product | 1250° C. × 12 hrs | 4.71 | 6.7 × 10$^{-4}$ |

Figure 13:
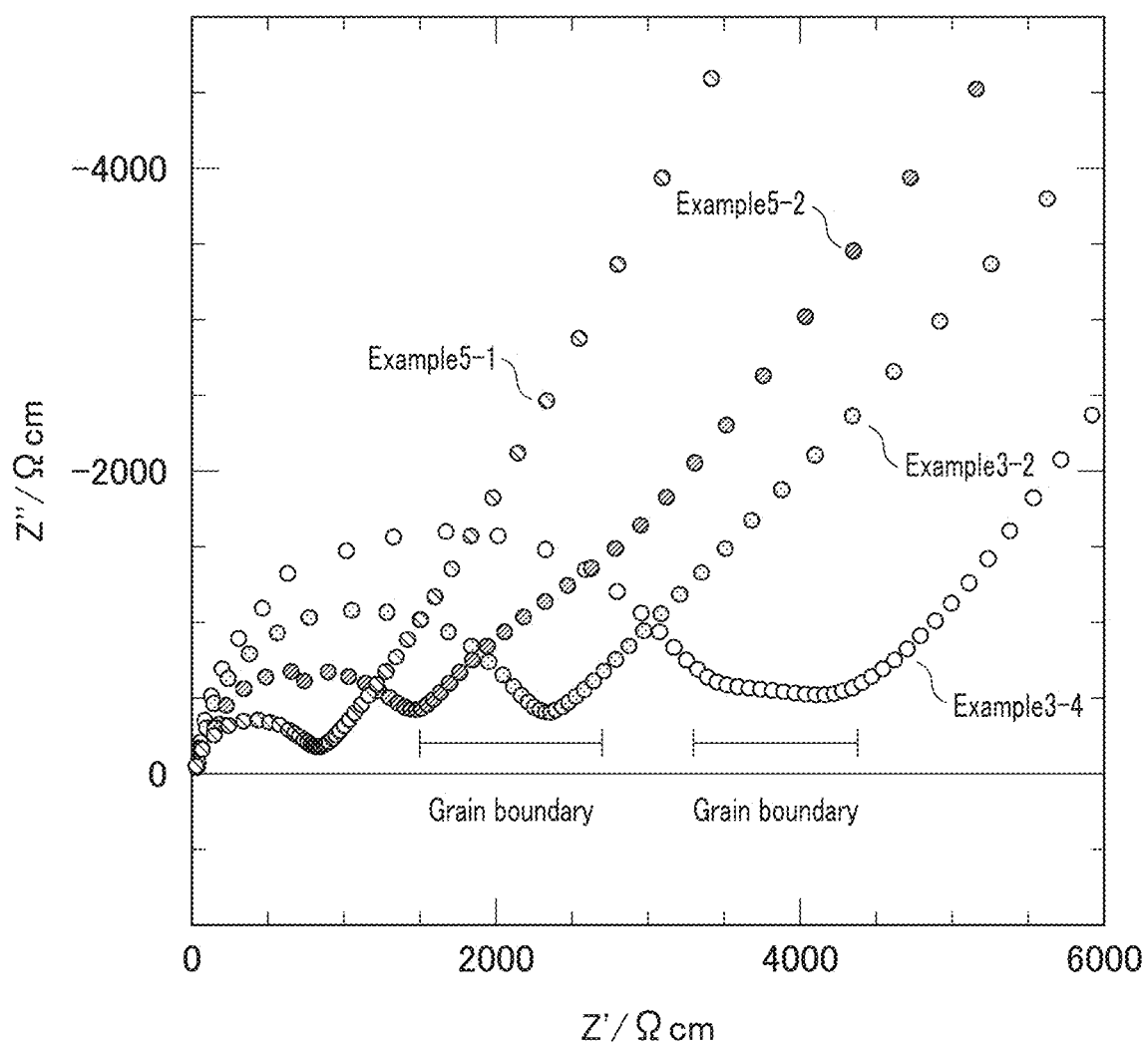
FIG. 13 is a view showing a Nyquist plots of AC impedance of the sintered bodies (solid electrolytes)

FIG. 13 shows a Nyquist plot of impedance in example 5-1 and example 5-2, together with the results of example 3-2 and example 3-4. It is shown that the sintered body (example 5-2) produced from the Ga-doped LLZO fired product showed smaller semicircle and had a higher conductance than the sintered body (example 3-4) produced from the Al-doped LLZO fired product. Furthermore, the sintered body (example 5-1) produced from the Ga-doped heat-treated product showed higher conductance than the sintered body (example 5-2) produced from the fired product. In both the sintered body (example 5-1) produced from the Ga-doped heat-treated product and the sintered body (example 3-2) produced from the Al-doped heat-treated product (example 3-2), no components that seemed to be grain boundary resistance were observed in the Nyquist plot.

Figure 14A:
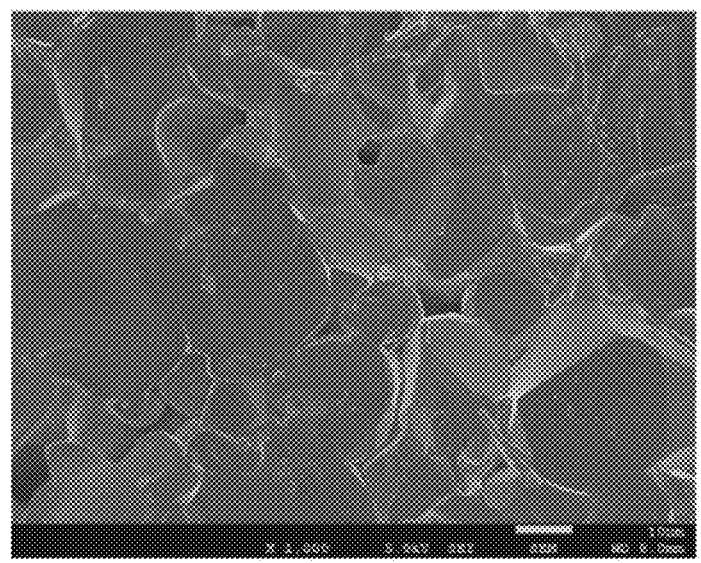
FIGS. 14(a)-14(b) are views showing SEM images of fractured surfaces of the sintered bodies (solid electrolytes.
Figure 14B:
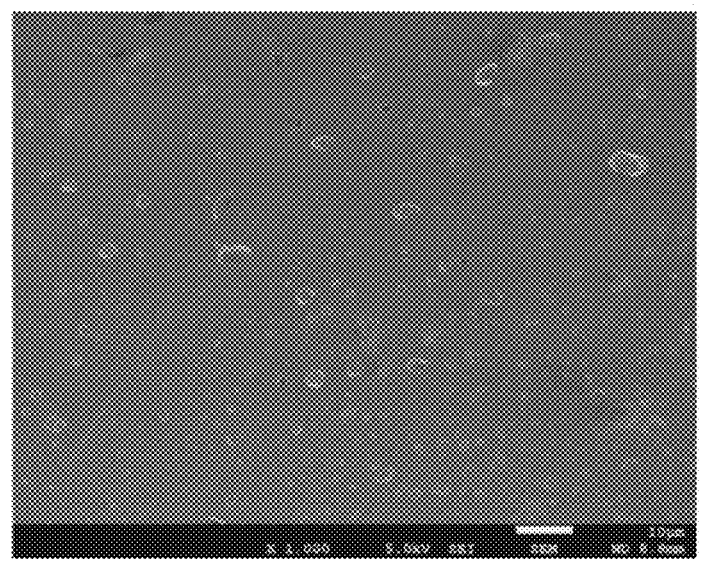

FIGS. 14(a) and (b) show SEM photographs of fractured surfaces of sintered bodies of example 5-1 and example 5-2, respectively. In the sintered body produced from fired product (example 5-2), although particles having a particle diameter of several tens μm were sintered densely, grain boundaries were observed among particles, and further relatively large holes having a size of about 5 to 10 μm were observed (FIG. 14(a)). On the other hand, in the sintered body (example 5-1) produced from the 400° C.-heat-treated product, closed pores having a size of several μm or less were observed, but dense sintering was observed, and the grain boundary was hardly observed (FIG. 14(b)).

The invention claimed is:

1. A composite oxide powder comprising particles comprising lithium (Li), lanthanum (La), zirconium (Zr), and oxygen (O), and having a cubic garnet-type crystal structure,
wherein the particles have a basic composition represented by the formula: $Li_7La_3Zr_2O_{12}$;
the composite oxide powder having a 50% diameter (D50) in a volume particle size distribution of 1000 nm or less, and a content ratio of a pyrochlore phase of 10 mass % or less; and
the composite oxide powder has a peak half width of a (211) diffraction line in an X-ray diffraction (XRD) profile of 0.50° or less.

2. The composite oxide powder according to claim 1, wherein the 50% diameter (D50) is 600 nm or less.

3. The composite oxide powder according to claim 1, wherein the 50% diameter (D50) is 500 nm or less.

4. The composite oxide powder according to claim 1, wherein the particles further comprise at least one dopant element selected from the group consisting of aluminum (Al), gallium (Ga), magnesium (Mg), and niobium (Nb).

5. The composite oxide powder according to claim 1, wherein the particles further comprise only gallium (Ga) as the dopant element.

6. The composite oxide powder according to claim 5, wherein the particles have a basic composition represented by the formula: $Li_{7-3x}Ga_xLa_3Zr_2O_{12}$ wherein $0.1 \leq x \leq 0.5$ is satisfied.

7. A method for producing a composite oxide powder according to claim 1, the method comprising:
preparing at least a lithium (Li) source, a lanthanum (La) source, and a zirconium (Zr) source as raw materials;
blending and mixing the raw materials to obtain a mixture;
firing the mixture to obtain a fired product;
pulverizing the fired product to obtain a pulverized product; and
heat-treating the pulverized product to obtain a heat-treated product,
the fired product being pulverized in an organic solvent using a bead mill, when pulverizing the fired product.

8. The method according to claim 7, wherein lithium carbonate ($Li_2CO_3$) is used as the lithium (Li) source.

9. The method according to claim 7, wherein in blending the raw materials, the lithium (Li) source is blended in an amount of 1 to 20 mass % in excess with respect to a stoichiometric composition of a garnet-type crystal structure.

10. The method according to claim 7, wherein in firing the mixture, the mixture is subjected to a first firing at a temperature of 700° C. to 1000° C., and further to a second firing at a temperature of 900° C. to 1100° C.

11. The method according to claim 7, wherein the organic solvent is at least one selected from the group consisting of an alcohol-based solvent, a ketone-based solvent, an ester-based solvent, a glycol ether-based solvent, a hydrocarbon-based solvent, an ether-based solvent, a glycol-based solvent, and an amine-based solvent.

12. The method according to claim 11, wherein the organic solvent is at least one of isopropyl alcohol (IPA) and toluene.

13. The method according to claim 11, wherein the organic solvent is toluene.

14. A method for producing a solid electrolyte, the method comprising:
preparing a composite oxide powder;
molding the composite oxide powder into a molded body; and
firing the molded body to obtain a sintered body,
the composite oxide powder being produced by the method according to claim 9, when preparing the composite oxide powder.

15. A method for producing a lithium-ion secondary battery, the method comprising:
preparing at least an exterior material, a positive electrode, a negative electrode, and a solid electrolyte; and
disposing the positive electrode and the negative electrode in the exterior material such that the positive electrode and the negative electrode face each other, and disposing the solid electrolyte between the positive electrode and the negative electrode,
the solid electrolyte being produced by the method according to claim 14, when preparing the solid electrolyte.

* * * * *